C. F. NAYER.
HOG SCRAPER.
APPLICATION FILED MAY 23, 1918.
1,329,725.
Patented Feb. 3, 1920.
4 SHEETS—SHEET 1.
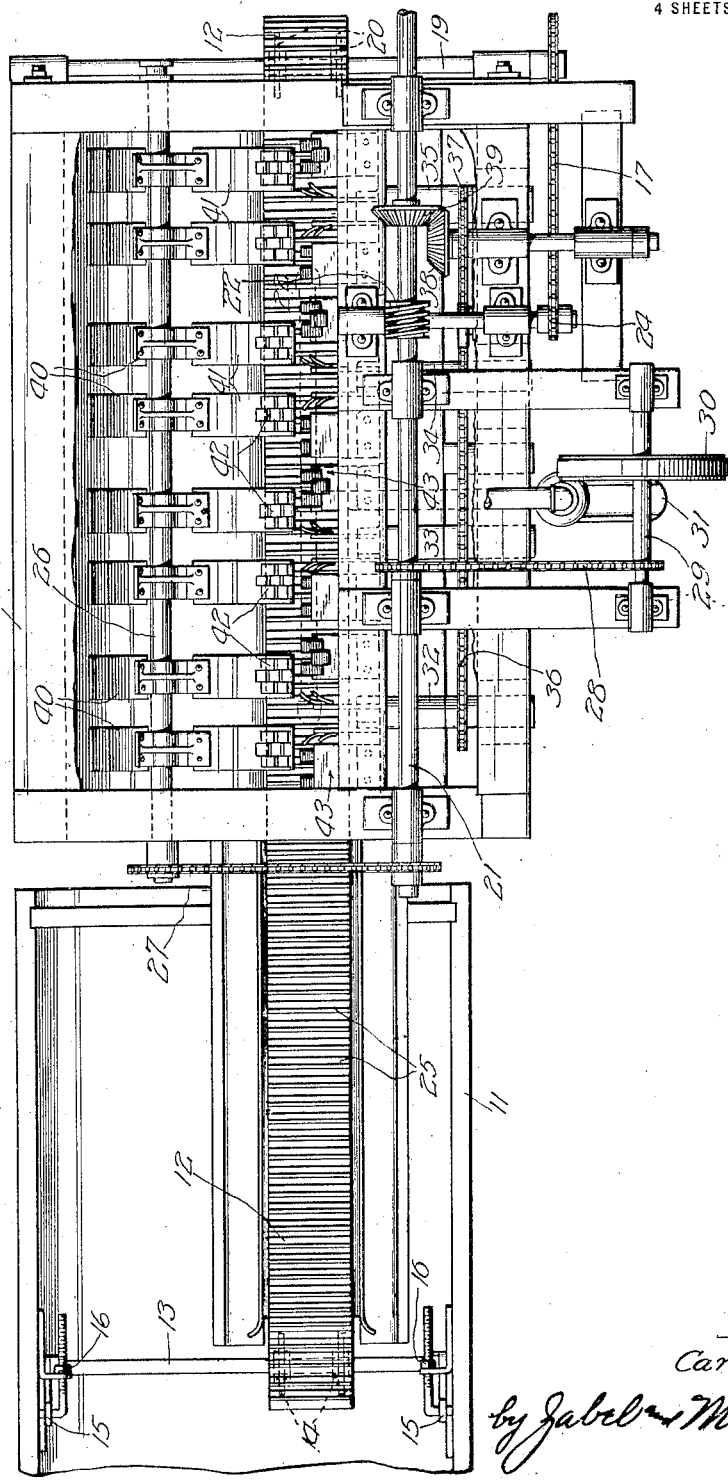
Inventor
Carl F. Nayer
by Jabel & Mueller
Attys

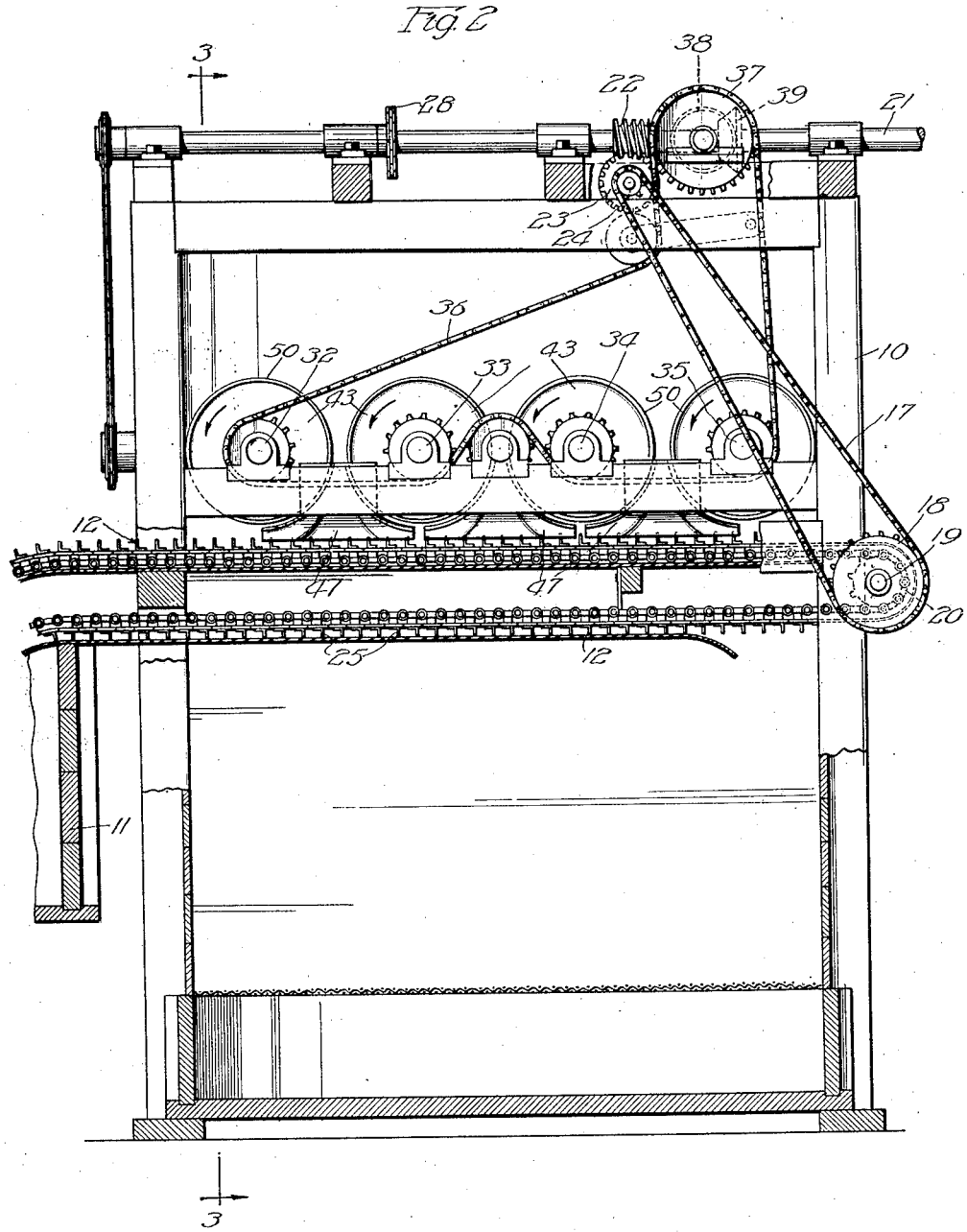

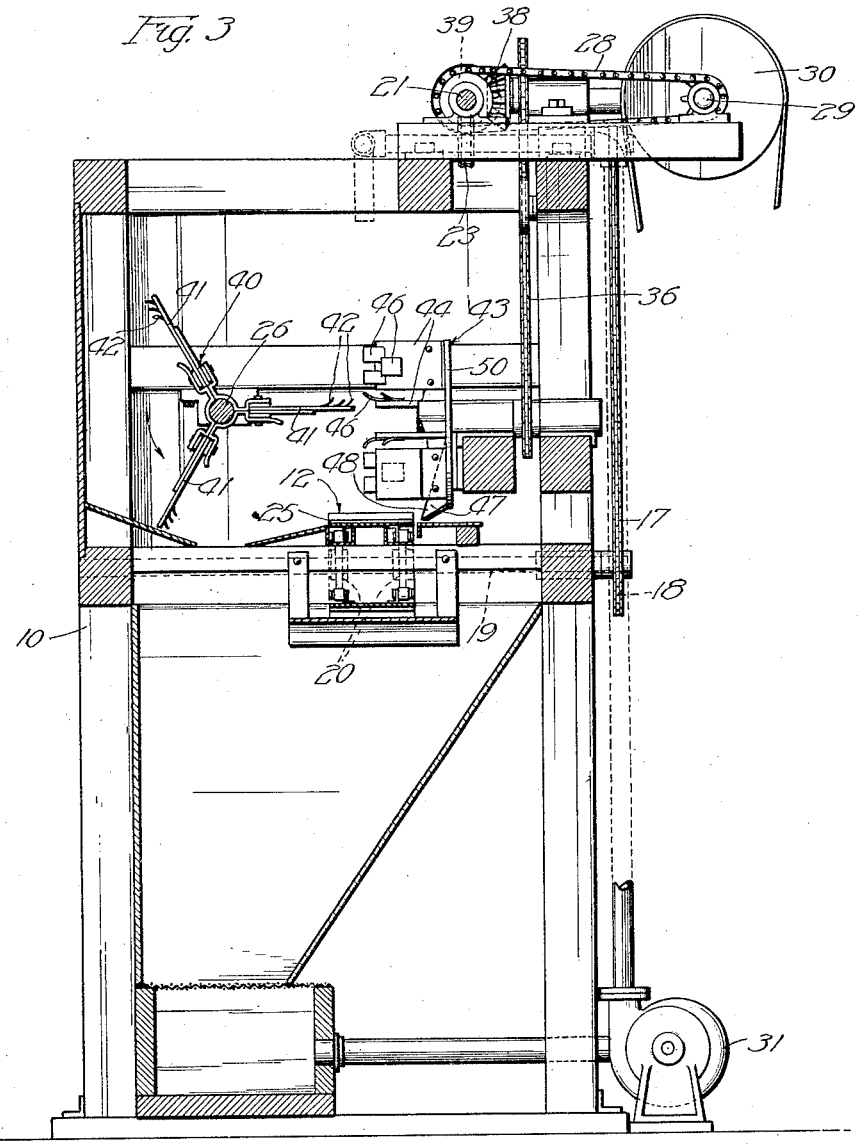

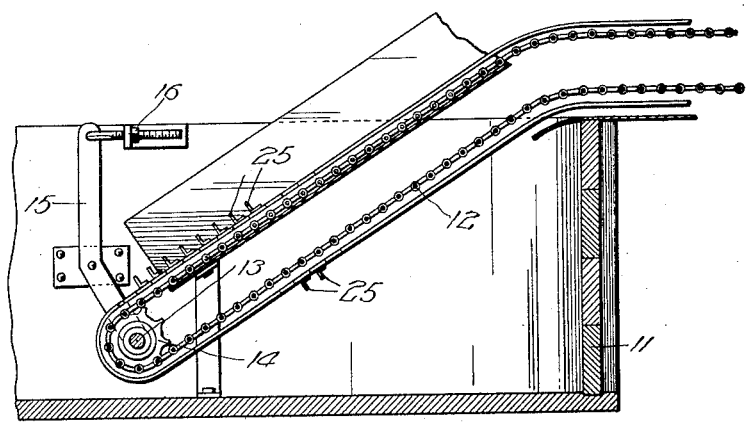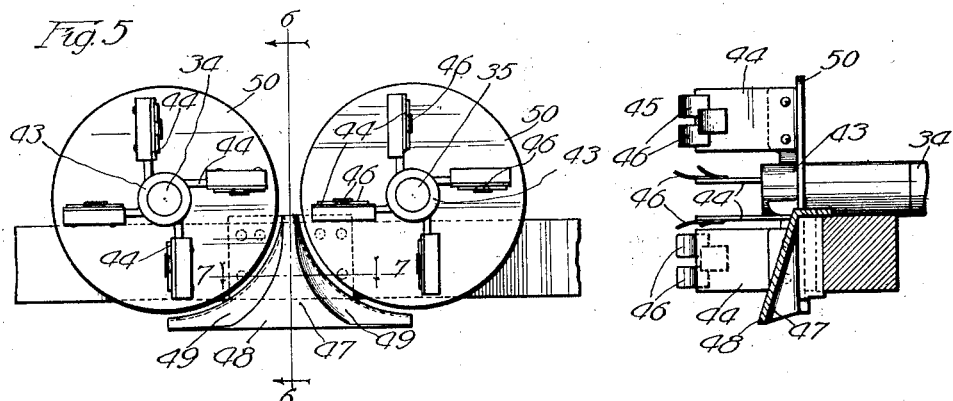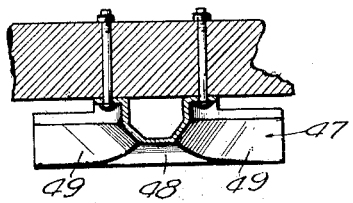

UNITED STATES PATENT OFFICE.

CARL F. NAYER, OF CHICAGO, ILLINOIS, ASSIGNOR TO PACKERS MACHINERY & EQUIPMENT COMPANY, OF CHICAGO, ILLINOIS.

HOG-SCRAPER.

1,329,725.   Specification of Letters Patent.   Patented Feb. 3, 1920.

Application filed May 23, 1918. Serial No. 236,106.

*To all whom it may concern:*

Be it known that I, CARL F. NAYER, a citizen of the United States, residing at Chicago, in the county of Cook and State of Illinois, have invented a certain new and useful Improvement in Hog-Scrapers, of which the following is a full, clear, concise, and exact description, reference being had to the accompanying drawings, forming a part of this specification.

My invention relates to hog scrapers, and has for its object the provision of an improved device of this character in which the dehairing of the animal is brought about more completely and effectively, and which likewise in its actuations is adapted more thoroughly to perform other functions in the cleaning of a hog, such as a more thorough cleansing of the skin and removal of the toe nails.

My invention more particularly is an improvement over the structure disclosed in my co-pending application Serial No. 168,234, filed May 12, 1917.

In the preferred form of my invention, as disclosed herein, I provide a conveyer which loosely carries the animal through the machine, which in its passage through the machine is acted upon by sets of beater or dehairing elements. One of these sets of dehairing elements is so arranged that the individual beater elements thereof act upon the carcass in a circular path instead of by a sweeping striking movement as heretofore. The preferred manner in which I bring this about is by mounting the beater elements in a transverse face to the axis of rotation, which axis, points toward the carcass so that the carcass is presented to a yieldable disk-like face of the beater which acts upon the carcass in a circular path. I also provide suitable means for preventing the carcass from wedging between the dehairing elements.

I will describe this form which my invention may take more in detail by referring to the accompanying drawings, in which—

Figure 1 is a top or plan view of a machine constructed in accordance with my invention;

Fig. 2 is a side view thereof, certain portions being shown in section;

Fig. 3 is a sectional view on line 3—3 of Fig. 2;

Fig. 4 is a continuation of the view shown in Fig. 2 to illustrate the left hand extremity of the machine.

Fig. 5 is an end view of two of the beater elements of the right hand set of beater elements shown in Fig. 3;

Fig. 6 is a sectional view on line 6—6 of Fig. 5, and

Fig. 7 is a fragmentary sectional view of line 7—7 of Fig. 5.

In the drawings I illustrate a framework 10 which is of suitable construction to support the various parts of the machine. This framework is mounted adjacent to a second framework 11 which is preferably constructed in the form of a tank from which the carcasses are conveyed to the machine proper, as carried upon the framework 10. An endless conveyer 12 extends from the tank 11 upwardly as shown more clearly in Fig. 4, and is then maintained substantially horizontally throughout the framework 10. The tension of the conveyer is suitably regulated by supporting the axle 13 upon which sprockets 14 are mounted, in a lever 15 which may be moved into its proper position by adjusting the nut 16. The conveyer is driven by means of the chain 17 which coöperates with a sprocket wheel 18 mounted upon a shaft 19 which carries the sprockets 20 for driving the conveyer. Power is derived from the power shaft 21 which through the interposition of the worm 22 and worm wheel 23 drives the sprocket 24. The conveyer is provided with suitable projections 25 which may be made of angle iron, if desired, which assist in maintaining the carcass in a given position upon the conveyer. The framework 10 likewise has suitable provision to support a beater shaft 26 longitudinally of the conveyer, which beater shaft is driven by means of a chain 27, which chain directly receives its power from the power shaft 21. (Figs. 1–3). The power shaft 21 likewise through the agency of a chain 28 drives the countershaft 29 carrying the pulley 30 which operates the pump 31. The framework 10 likewise carries a plurality of transversely placed beater shafts 32, 33, 34 and 35. These beater shafts are all driven through the agency of a chain 36, as clearly evident from Fig. 2, this chain 36 receiving its power from a sprocket 37 which is driven through the agency of the bevel gears 38, 39, the bevel gear 39 being carried directly by the power shaft 21.

The longitudinal shaft 26 carries a plurality of sets of radially disposed beater elements 40, each set consisting of a number or group of beaters 41, as shown more clearly in Fig. 3. Each of the beaters 41 is flexible and carries dehairing elements 42 designed to perform the function of dehairing the carcass. The beater elements 40 are substantially similar in form to those shown in my said co-pending application.

The transverse beater shafts 32, 33, 34 and 35, however, carry beater elements 43, each having a group of beaters 44, as more clearly apparent from Figs. 5 and 6. These beater elements, as will be seen from a further inspection of Figs. 3, 5, and 6, travel in a circular path upon the carcass. The effect of these elements 43 when rotating is to present a yieldable disk-like face to the carcass as it is moved by.

The beaters that are in coöperative relation with the carcass effect a circular action upon that carcass as it is traveling past those particular beater elements, thus performing more of a massaging than striking action as heretofore.

Therefore a higher peripheral speed is possible than where there is more of a slap. With a greater slap, a high striking speed bruises the skin, loosening it from the fat. By working on a circular path, a greater speed is permissible thus getting a better cleansing action. Also the circular path of travel massages the skin in many directions. The arms 44 are provided with dehairing elements 46, the arms 44 being resilient to permit them to accommodate themselves to the body of the carcass and its extremities.

I find that I get a more thorough dehairing of the carcass by reason of the arrangement of the beater elements 43 when acting in coöperation with the beater elements 40. I find likewise that various other functions are performed such as the removal of the toe nails in a more thorough and complete manner, and a more thorough cleansing of skin effected than has hitherto been possible. The effect of the rotative movement of the beater elements 43 upon a carcass of normal size is to neutralize any retarding influence that these beater elements may exert, that being due to the fact that the beater elements, as they rotate travel in one direction and then in another. The direction of rotation of the beater elements 43 is shown by the arrows in Fig. 2 and the arrow in Fig. 3 shows the direction of rotation of the beater elements 40.

In order to prevent the carcass as it travels through the machine from becoming wedged between two of the beater elements 43, I provide a guide structure 47, shown more clearly in Figs. 5, 6, and 7. The guide 47 has a protruding face 48 and sloping sides 49 which slope toward the disks 50, which disks completely close the space back of the arms 44 and upon which disks the said arms are mounted. These guides 47 thus prevent any tendency which there might be on the part of the traveling carcass to become wedged between and adjoining disks 50. The continuity of travel of the carcass is thereby insured.

The carcasses travel through the machine in spaced relation and travel substantially at the speed of the conveyer, the operations of the beater elements being such as before stated that very little, if any, derangement of the spaced relationship is brought about.

Furthermore the action of the beaters 40 carried upon shaft 26 is to impart a rolling motion to the hog as it is conveyed past the disk-like beaters 43 so that these beaters 43 may act all around the carcass.

The action of the two sets of beater elements, respectively, the sets 40 and 43, is such as not to materially influence the speed of the carcass as it is passing through the machine at the rate of travel of the conveyer.

From what has been thus described the nature of my invention will be clear to those skilled in the art.

Having however thus described one form which my invention may take, what I claim as new and desire to secure by Letters Patent is:

1. A dehairing machine having a non-rotatable conveyer adapted to carry carcasses therethrough, in combination with two sets of beater elements for simultaneously operating upon opposite sides of said carcass, the beater elements of one set acting upon said carcass in a circular path.

2. A dehairing machine having a belt conveyer adapted to carry carcasses therethrough, in combination with two sets of beater elements for operating upon said carcass, the beater elements of one set acting upon said carcass in a circular path, and the beater elements of the other set acting upon said carcass with a sweep motion in a plane transverse to the direction of travel of said carcasses to scrape and turn the carcass on the conveyer.

3. A dehairing machine having a conveyer adapted to carry carcasses therethrough, in combination with two sets of beater elements for operating upon said carcass, the beater elements of one set acting upon said carcass in a circular path, and guides interposed between the beater elements of the last aforesaid set to prevent said carcasses from entering the space between said beater elements.

4. A dehairing machine having a conveyer adapted to carry carcasses therethrough in combination with two sets of beater elements for operating upon said carcass, the beater elements of one set acting upon said carcass in a circular path, and guides interposed between the beater elements of the last aforesaid set to prevent said carcasses from entering the space between said beater elements and the beater elements of the other set acting upon said carcass with a sweep motion in a plane transverse to the direction of travel of said carcasses.

5. A dehairing machine having a conveyer adapted to carry carcasses therethrough, in combination with two sets of beater elements for operating upon said carcass, the beater elements of one set acting upon said carcass in a circular path, and oppositely sloping guides interposed between the beater elements of the last aforesaid set to prevent said carcasses from entering the space between said beater elements.

6. A dehairing machine having a conveyer adapted to carry carcasses therethrough, in combination with two sets of beater elements for operating upon said carcass, the beater elements of one set acting upon said carcass in a circular path, and oppositely sloping guides interposed between the beater elements of the last aforesaid set to prevent said carcasses from entering the space between said beater elements and the beater elements of the other set acting upon said carcass with a sweep motion in a plane transverse to the direction of travel of said carcasses.

7. A dehairing machine having a conveyer adapted to carry carcasses therethrough, in combination with two sets of beater elements for simultaneously operating upon opposite sides of said carcass, the beater elements of one set acting upon said carcass in a circular path, each of said last aforesaid beater elements including a rotatable hub and flexible arms projecting forwardly thereof, said arms being provided with dehairing elements.

8. A dehairing machine having a conveyer adapted to carry carcasses therethrough, in combination with two sets of beater elements for simultaneously operating upon opposite sides of said carcass, the beater elements of one set acting upon said carcass in a circular path, each of last aforesaid beater elements including a rotatable hub and arms projecting forwardly thereof, said arms being provided with dehairing elements, and the beater elements of the other set acting upon said carcass with a sweep motion in a plane transverse to the direction of travel of said carcasses to thereby turn the carcass on the conveyer.

9. A dehairing machine having a conveyer adapted to loosely carry carcasses therethrough, in combination with two sets of beater elements for simultaneously operating upon opposite sides of said carcass, the beater elements of one set acting upon said carcass in a circular path and means to prevent the carcass from entering between the beater elements of said one set.

10. A dehairing machine having a conveyer adapted to loosely carry carcasses therethrough, in combination with two sets of beater elements for simultaneously operating upon opposite sides of said carcass, the beater elements of one set acting upon said carcass in a circular path, and the beater elements of the other set acting upon said carcass with a sweep motion in a plane transverse to the direction of travel of said carcasses to thereby turn the carcass on the conveyer.

11. A dehairing machine having a non-rotatable conveyer adapted to carry carcasses therethrough in combination with two sets of beater elements for simultaneously operating upon opposite sides of said carcass, the beater elements of one set acting upon said carcass in a circular path, the axes of said one set of beater elements pointing horizontally toward the carcasses upon which said beater elements are operating.

12. A dehairing machine having a conveyer adapted to carry carcasses therethrough, in combination with two sets of beater elements for simultaneously operating upon opposite sides of said carcass, the beater elements of one set acting upon said carcass in a circular path, and the beater elements of the other set acting upon said carcass with a sweep motion in a plane transverse to the direction of travel of said carcasses to thereby turn the carcass on the conveyer, the axes of said first aforesaid set of beater elements pointing toward the carcasses upon which said beater elements are operating.

13. A dehairing machine having a conveyer adapted to carry carcasses therethrough, in combination with rotatable beater elements acting upon the carcass in a circular path, and other beater elements for turning the carcass rotating in a plane transverse to the first said beater elements said two sets of beater elements acting simultaneously upon opposite sides of said carcass.

14. A dehairing machine having a belt conveyer adapted to carry carcasses therethrough, in combination with rotatable beater elements acting upon the carcass in a circular path, and other beater elements which roll the carcass on the conveyor as it is conveyed past the first said beater elements.

15. A hog dehairing machine having a plurality of dehairing devices having dehairing elements operating in a substantially circular path of contact on the surface of the carcass throughout the entire travel of said dehairing elements.

16. A hog dehairing machine having a plurality of dehairing devices provided with elements operating in a circular path of contact on the surface of the carcass, the center line of the carcass being in substantial coincidence with the axis of rotation of said dehairing devices.

17. A device of the character described comprising a horizontal conveyer for carcasses, a set of beater elements at one side of the conveyer, a shaft on the opposite side and parallel to the conveyer, a second set of beater elements rotatable with the shaft adapted to turn the carcass on the conveyer in contact with the first set of beaters.

18. A device of the character described comprising a horizontal conveyer, a set of beaters at one side of the conveyer with its axis projecting at right angles to the conveyer, and a second set of beaters at the opposite side of the conveyer with its axis parallel to the conveyer adapted to turn the carcass on the conveyer.

In witness whereof, I hereunto subscribe my name this 11th day of May, A. D., 1918.

CARL F. NAYER.